United States Patent [19]

Yoon et al.

[11] Patent Number: 5,502,539
[45] Date of Patent: Mar. 26, 1996

[54] CAMERA CAPABLE OF CONTROLLING A SUPPLY OF POWER AND RELATED CONTROL METHOD

[75] Inventors: Tae-kyeong Yoon; Seong-tae Kim; Bon-jeong Goo, all of Changwon-si, Rep. of Korea

[73] Assignee: Samsung Aerospace Industries, Ltd., Kyeongsangnam, Rep. of Korea

[21] Appl. No.: 216,322

[22] Filed: Mar. 23, 1994

[30] Foreign Application Priority Data

Mar. 25, 1993 [KR] Rep. of Korea .......................... 934740

[51] Int. Cl.⁶ ................................................... G03B 7/26
[52] U.S. Cl. ............................................................ 354/484
[58] Field of Search ................................................ 354/484

[56] References Cited

U.S. PATENT DOCUMENTS

| | | | |
|---|---|---|---|
| 4,933,704 | 6/1990 | Takami et al. | 354/484 |
| 5,049,917 | 9/1991 | Yasukawa et al. | 354/484 |
| 5,130,730 | 7/1992 | Ishii et al. | 354/253 |

Primary Examiner—David M. Gray
Assistant Examiner—Matthew Miller
Attorney, Agent, or Firm—Finnegan, Henderson, Farabow, Garrett & Dunner

[57] ABSTRACT

A camera capable of controlling the supply of power to the internal circuitry of the camera which includes a power supply for supplying power to the internal circuitry of the camera, circuitry for determining one or more photographic conditions associated with an object, and circuitry for concurrently activating the power supply and the determining circuitry to initiate a photograph taking operation.

8 Claims, 2 Drawing Sheets

CAMERA CAPABLE OF CONTROLLING A SUPPLY OF POWER AND RELATED CONTROL METHOD

BACKGROUND OF THE INVENTION

1. Field of the Invention

The present invention relates to a camera, more particularly, to a camera capable of controlling a supply of power using a release switch.

2. Description of the Related Art

Conventionally, a user operates a power switch, a main switch in a camera, before taking a photograph. When the power switch is turned ON, a lens cap is opened and power is supplied to the camera. When the user subsequently presses a release switch, the camera is placed in a stand-by mode and is ready to start photograph taking operations.

If the user attempts to take a photograph in the stand-by mode and presses the release switch, a first step release switch is turned ON to determine the proper amount of illumination and the distance from the object to be photographed. A second step release switch is turned ON to take the photograph.

However, in the conventional camera, the user has to press the power switch to open the lens cap and also supply power to an internal circuitry of the camera to place the camera in the stand-by mode for photograph taking. This not only requires time to place the camera in the stand-by mode, but also requires pressing the release switch in addition to the pressing of the power switch, which often makes it difficult for the user to photograph an instant image.

The user cannot take a photograph by pressing the release switch without turning the power switch ON. Further, even after the power switch is turned ON, if the release switch is not activated for a predetermined time, the lens cap is automatically closed. Therefore, if the user takes a photograph without realizing a discontinuity in the power supply, he will lose the chance to photograph an instant image.

SUMMARY OF THE INVENTION

An object of the present invention is to provide a camera capable of controlling the supply of power by using a release switch allowing the user to take a photograph by only pressing the release switch even when the lens cap is closed.

To achieve this and other advantages in accordance with the purpose of the invention, as embodied and broadly described herein, a camera includes means for supplying power to an internal circuitry of the camera, means for determining one or more photographic conditions associated with an object, and means for concurrently activating the power supplying means and the determining means to initiate a photograph taking operation.

In another aspect of the present invention, a method is provided for a camera capable of controlling a supply of power to an internal circuit of the camera. The method includes concurrently activating the supply of power to an internal circuit of the camera and determining photographic conditions associated with an object to initiate a photograph taking operation based on the photographic condition.

The objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

The accompanying drawings, which are included to provide a further understanding of the invention and are incorporated in and constitute as part of this specification, illustrate one embodiment of the invention and together with the description, serve to explain the principles of the invention.

DESCRIPTION OF THE PREFERRED EMBODIMENT

Figure 1:
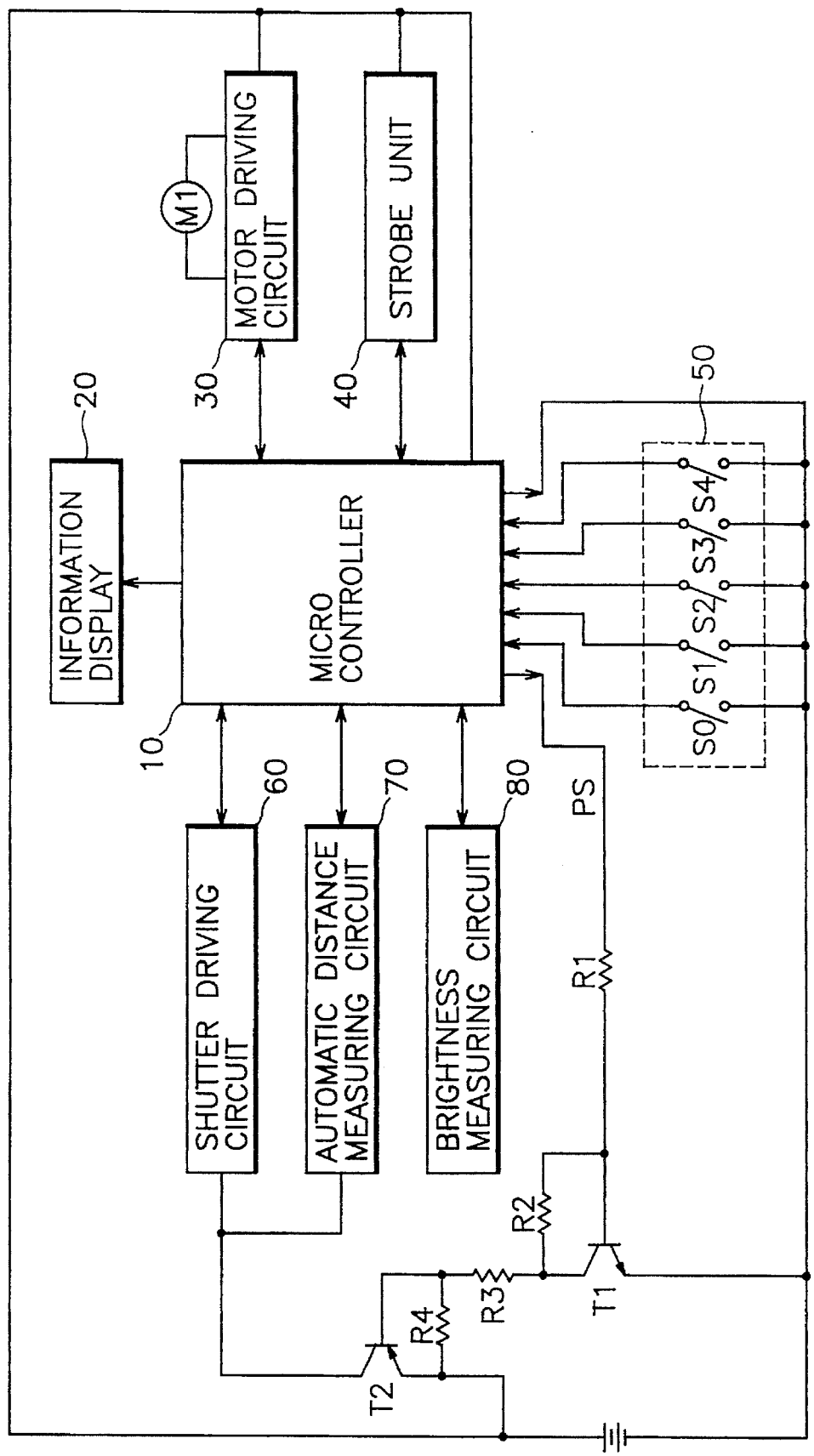
FIG. 1 is a block diagram of a camera illustrating one embodiment of the present invention.

Referring to FIG. 1, a camera capable of controlling the supply of power using a release switch according to one embodiment of the present invention includes a microcontroller 10 for outputting a control signal and a power signal. The camera includes an information display 20 connected to an output terminal of the microcontroller 10, a motor driving circuit 30, a strobe unit 40, and a switch block 50. The switch block 50 is connected to an input terminal of the microcontroller 10. The camera also includes a shutter driving circuit 60 connected to an operating terminal and an output terminal of the microcontroller 10, an automatic distance measuring circuit 70, and a brightness measuring circuit 80.

The switch block 50 includes a power switch S0 for supplying power to each part of the camera, a first step release switch S1 for measuring the distance from the camera to an object to be photographed, automatically and the ambient brightness of the object, and a second step release switch S2 for taking the photograph by releasing a shutter button. The switch block 50 also includes a zoom switch S4 for zooming and a mode selecting switch S3 for selecting one of a plurality of photographing functions, including for example, a successive photographing mode, a strobe mode, and a snap photographing mode.

A power transmitting circuit supplies power to the shutter driving circuit and the automatic distance measuring circuit to take a photograph. The power transmitting circuit includes resistors R1, R2, R3 and R4 and transistors T1 and T2. The resistor R1 has a first terminal connected to a power signal (PS) terminal of the microcontroller 10 and the transistor T1 has a base terminal connected to a second terminal of the resistor R1. An emitter terminal of the transistor T1 is connected to ground. The resistor R2 has a first terminal connected to the second terminal of the resistor R1 and a second terminal connected to a collector terminal of the transistor T1. The resistor R3 has a first terminal connected to the collector terminal of the transistor T1.

The transistor T2 has a base terminal connected to the second terminal of the resistor R2, an emitter terminal connected to a power supply, and a collector terminal connected to both the shutter driving circuit 60 and the automatic distance measuring circuit 70. The resistor R4 has a first terminal connected to a second terminal of the resistor R3 and a second terminal connected to the emitter terminal of the transistor T1.

Figure 2:
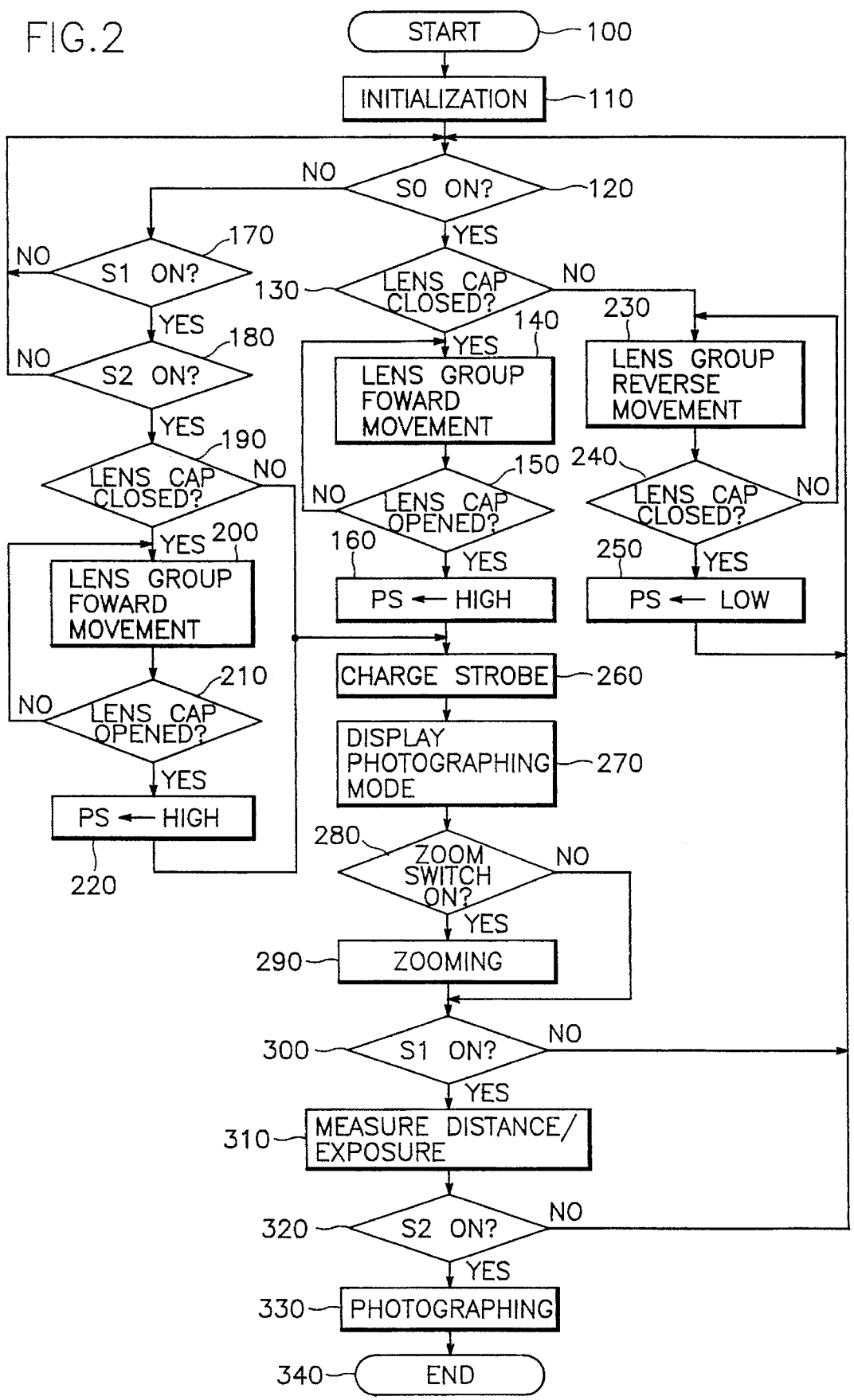
FIG. 2 is a flowchart showing the preferred operational steps of the present invention.

The operation of the camera according to the embodiment of the present invention will be described with reference to FIG. 2.

When power is applied to the camera (Step 100), the microcontroller 10 initializes an internal circuit of the camera (Step 110) and then determines whether the switch block 50 is activated (Step 120). The microcontroller 10 determines whether the power switch S0 of the switch block 50 is activated and determines the lens cap state when the power switch S0 is turned ON (Step 130). If the microcontroller 10 determines that the lens cap is closed, the lens cap is opened by operating the motor driving circuit 30 and forwardly rotating a lens barrel motor M1 (Step 140).

The microcontroller 10 determines when the lens cap is fully opened (Step 150). If the lens cap is fully opened, the microcontroller 10 outputs a high-level power signal to supply power to the shutter driving circuit 60 and the automatic distance measuring circuit 70 to take a photograph. The microcontroller 10 outputs the high-level power signal, which is applied to the base terminal of the transistor T1 through the resistance R1, to turn ON the transistor T1 (FIG. 1). Subsequently, a low-level power signal is applied to the base terminal of the transistor T2 to turn ON the transistor T2. When power is applied to the transistor T2, the shutter driving circuit 60 and the automatic distance measuring circuit 70 are supplied with the power. Then, the camera is placed in a stand-by mode ready to take a photograph.

The microcontroller 10 determines whether the power switch S0 of the switch block 50 is turned ON. When the power switch S0 is turned OFF, the microcontroller 10 determines whether the first step release switch S1 is turned ON (Step 170). If the first step release S1 is turned ON, the microcontroller 10 determines whether the second step release switch S2 is turned ON (Step 180). Subsequently, if the second step release switch S2 is turned ON, the microcontroller 10 determines the state of the lens cap (Step 190). The microcontroller 10 opens the lens cap by operating the motor driving circuit 30 when the lens cap is initially closed and the power switch S0 is turned OFF (Step 200).

At this point in the zoom camera, a close (or telephoto) mode is changed to a wide mode which is the optical initial mode of the camera. For example, for a 3× zoom camera in which the focal distance is 38 m–115 m, the lens barrel moves from a close mode to a wide mode (38 m) when the power switch S0 is turned OFF and the first step release switch S1 and the second step release switch S2 are turned ON.

After the above-mentioned operation, the microcontroller 10 determines again whether the lens cap is opened (Step 210). If the lens cap is opened, microcontroller 10 outputs the high-level power signal to be in a stand-by mode for taking the photograph (Step 220) and supplies power to the shutter driving circuit 60 and the automatic distance measuring circuit 70.

When the power switch S0 is turned ON (Step 120) and the lens cap is opened (Step 130), the microcontroller 10 closes the lens cap by operating the motor driving circuit 30 and rotating, in reverse, the lens barrel motor M1 (Step 230). Subsequently, the microcontroller 10 determines whether the lens cap is closed (Step 240), and if closed, outputs the low-level power signal (Step 250). When the low-level power signal is applied to the base terminal of the transistor T1, the transistor T1 and subsequently, the transistor T2 are turned OFF. When the transistor T2 is turned OFF, the power supplied to the shutter driving circuit 60 and the automatic distance measuring circuit 70 is cut off and the user can no longer take a photograph.

When the camera is in a stand-by mode, the microcontroller 10 starts charging the strobe unit 40 by emitting a predetermined illumination, in cases for underexposure, to obtain a photograph having a suitable exposure (Step 260).

After starting a charge of electricity to the strobe unit 40, the microcontroller 10 sets the present photographing mode in accordance with the selected mode of the photographing mode selecting switch S3, transmits the photographing mode information to the information display 20 and displays the photographing mode. Accordingly, the user can confirm the present photographing mode (Step 270).

The microcontroller 10 carries out a zoom operation (Step 290) by operating the motor driving circuit 30 according to the user selection when the zoom switch S4 of the switch block 50 is turned ON (Step 280). The microcontroller 10 stands by ready for operation of the first step release switch when the zoom switch is turned OFF.

After the above-mentioned operation, the microcontroller 10 determines whether the first step release switch S1 is turned ON (Step 300). When the first step release switch S1 is turned ON, the microcontroller 10 measures the distance from the object and the brightness by the automatic distance measuring circuit 70 and by the brightness measuring circuit 80, respectively, to calculate the exposure value (Step 310). Subsequently, the microcontroller 10 determines whether the second step release switch S2 is turned ON (Step 320). The microcontroller 10 takes the photograph (Step 330) and ends the operation (Step 340) by operating the shutter driving circuit 60 in accordance with the calculated exposure value.

As described above, when the first step release switch and the second step release switch are turned ON even when the power switch is turned OFF, the first and second step release switches open the lens cap and supply power to the camera to take a photograph. The user can capture an instant image by only pressing the release switch, even when the lens cap is closed.

Accordingly, the present invention provides a camera and a control method capable of controlling power by using a release switch having the effect of taking a photograph by pressing both the power switch and the release switch or the release switch only. The user can take the photograph easily by pressing only the release switch, successively.

Other embodiments of the invention will be apparent to those skilled in the art from the consideration of the specification and practice of the invention disclosed herein. It is intended that the specification and examples be considered as exemplary only, with a true scope and spirit of the invention being indicated by the following claims.

What is claimed is:

1. A camera comprising:

means for supplying power to an internal circuitry of the camera;

a power switch connected to the power supplying means and the internal circuitry, the power switch having one each of ON and OFF states;

means for determining one or more photographic conditions associated with an object; and means for concurrently activating the power supplying means and the determining means to initiate a photograph taking operation while the power switch is in the OFF state.

2. The camera of claim 1, further comprising a lens cap covering a lens of the camera, wherein the activating means includes means for removing the lens cap from the lens of the camera to expose the lens to the object whenever the power supplying means is activated.

3. The camera of claim 2, wherein the activating means includes micro controller means for generating a control signal to activate the power supplying means and the determining means.

4. The camera of claim 3, wherein the micro controller means further includes means for determining whether the lens cap has been removed from the lens, and wherein the removing means includes means for removing the lens cap if it is determined that the lens cap has not been removed from the lens.

5. The camera of claim 2, wherein the activating means includes release switching means for supplying power to the internal circuitry of the camera and selecting a standby state for the photograph taking operation while the power switch is not operated.

6. The camera of claim 2, wherein the release switching means includes first release means for activating the removing means to remove the lens cap from the lens and the determining means to determine the photographic conditions, and second release means for releasing a shutter to initiate the photograph taking operation based on the photographic conditions.

7. A method for controlling a supply of power to a camera comprising concurrently activating the supply of power to an internal circuit of the camera while a camera power switch is not activated and determining photographic conditions associated with an object to initiate a photograph taking operation based on the photographic condition.

8. The method of claim 7, further comprising removing a lens cap from a lens of the camera whenever the supply of power is activated.

* * * * *

UNITED STATES PATENT AND TRADEMARK OFFICE
CERTIFICATE OF CORRECTION

PATENT NO. : 5,502,539
DATED : March 26, 1996
INVENTOR(S) : Tae-kyeong YOON et al.

It is certified that error appears in the above-indentified patent and that said Letters Patent is hereby corrected as shown below:

```
CLAIM 7, COLUMN 6, LINE 13, "condition" SHOULD READ
--conditions--.
```

Signed and Sealed this

Twenty-fourth Day of September, 1996

Attest:

BRUCE LEHMAN

Attesting Officer     Commissioner of Patents and Trademarks